United States Patent [19]

Daniels

[11] Patent Number: 4,839,549
[45] Date of Patent: Jun. 13, 1989

[54] COVER ASSEMBLY TO PROTECT AN ELECTRIC MOTOR CENTRIFUGAL ACTUATOR

[75] Inventor: Nicholas R. Daniels, St. Louis County, Mo.

[73] Assignee: Emerson Electric Co., St. Louis, Mo.

[21] Appl. No.: 177,058

[22] Filed: Apr. 4, 1988

[51] Int. Cl.⁴ .......................... H02K 5/10; H02K 9/06
[52] U.S. Cl. ..................................... 310/68 E; 310/88; 310/58; 310/62
[58] Field of Search .................. 310/68 E, 88, 89, 52, 310/58, 62; 318/793

[56] References Cited

U.S. PATENT DOCUMENTS 4,296,366  10/1981  Hildebrandt et al. ............... 318/793

FOREIGN PATENT DOCUMENTS 570666  5/1924  France ................................. 318/793

Primary Examiner—Patrick R. Salce
Assistant Examiner—Judson H. Jones
Attorney, Agent, or Firm—Polster, Polster and Lucchesi

[57] ABSTRACT

In an electric motor including a rotor on which is mounted a blower and a centrifugal actuator having spring-loaded lever members projecting through a centrally disposed recess in the spaced radial blade carrying back plate of the blower, an improved cover assembly arranged to be mounted on the rotor in interfitting relation with the spaced radial blades of the blower to cover the centrally disposed recess preventing contaminant build-up on the centrifugal actuator.

8 Claims, 2 Drawing Sheets

COVER ASSEMBLY TO PROTECT AN ELECTRIC MOTOR CENTRIFUGAL ACTUATOR

BACKGROUND OF THE INVENTION

The present invention relates to electric motor assemblies of the type having a rotor on which is mounted a centrifugal actuator and a bladed blower with the spring loaded lever members of the actuator projecting through a recess in the bladed blower and more particularly to a cover assembly for such an electric motor which cover assembly serves to prevent particulate contaminant buildup on the centrifugal actuator mounted on the rotor and to efficiently direct blower air flow.

It is known in the electric motor art to mount a bladed blower and centrifugal actuator on a motor shaft such as in a capacitor start motor where the floating plate of the actuator can serve as a switch actuator and mechanical brake. In such arrangements the spring-loaded lever members of the centrifugal actuator can project through a recess arrangement in the back plate of the blower to provide an efficient, compact and easy to assemble motor structure. The blade blower serves to direct a cooling air stream over the electric motor and, as mentioned, the centrifugal actuator serves to operate as both switch actuator and mechanical brake for the rotor motor.

The present invention recognizes that such an electric motor arrangement, however, often leads to the build-up of contaminants on parts of the centrifugal actuator, particularly in those situations where a motor of this type is employed with particulate generating tools—such as in the sawdust-generating woodworking industry. Further, the present invention recognizes that the motor cooling air flow stream generated by the blower must not be inhibited or inefficient in its flow function because of the compactly assembled nature of the centrifugal actuator and adjacent blower on the rotor shaft. Recognizing these problems, the present invention provides a unique cover assembly which not only efficiently directs air flow to be delivered by a bladed blower but at the same time ensures protection of the centrifugal actuator from contaminant build-up. The present invention accomplishes this with a novel and efficient cover assembly structure which requires a minimum of inexpensive materials which can be manufactured and assembled (and disassembled, if necessary) in a straightforward, efficient and economical manner with a minimum of steps.

Various other features of the present invention will become obvious to one skilled in the art upon reading the disclosure set forth herein.

SUMMARY OF THE INVENTION

More particularly, the present invention provides an electric motor rotor shaft assembly on which is mounted a bladed blower and a centrifugal actuator having spring-loaded lever members, the blower having a back plate with spaced blade members projecting therefrom to extend in radial fashion between centrally disposed recess means in the back plate and the outer periphery of the back plate and the spring-loaded lever members of the centrifugal actuator projecting through the centrally disposed recess means in the back plate, a cover assembly for the recess means in the back plate comprising: an open-ended cover member adapted to be mounted on the rotor shaft, the cover member being sized and shaped to efficiently direct air flow to the blade members and spacedly surround the centrifugal actuator extending through the recess means to cover the recess means to prevent particulate contaminant build-up on the centrifugal actuator. In addition, the present invention provides a light, flexible cover assembly which interfits with the spaced blade members of the bladed blower, the cover assembly of the present invention including a slotted side wall and a unique apertured end wall which is slotted and keyed for press fit, snap engagement with a rotor shaft to permit ready installation and removal of the cover assembly.

It is to be understood that various changes can be made by one skilled in the art in one or more of the several parts of the unique cover assembly disclosed herein without departing from the scope of spirit of the invention.

BRIEF DESCRIPTION OF THE DRAWINGS

Referring to the several figures of the drawings which disclose one advantageous embodiment of the present invention.

DESCRIPTION OF THE PREFERRED EMBODIMENT

Figure 1:
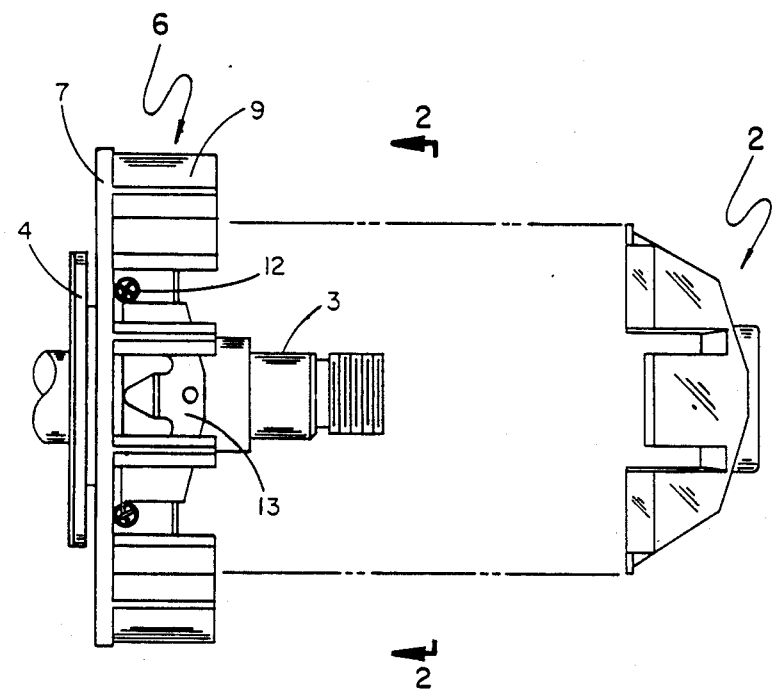
FIG. 1 is a side elevational view of an electric motor rotor shaft on which is mounted a centrifugal actuator and a bladed blower positioned adjacent such centrifugal actuator, the spring-loaded levers of the centrifugal actuator projecting through recess means in the back plate of the blower, this figure further including a side view of the inventive cover assembly therefor shown in exploded relation thereto.
Figure 1A:
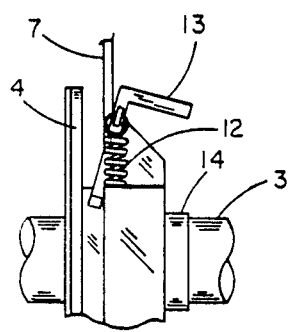
FIG. 1a is a side view of a portion of the electric motor rotor shaft of FIG. 1 rotated 90° to disclose the stepped, cross-shaped bridge raised from and extending across the recess means in the back plate of the blower with the weighted levers in actuated position.
Figure 1B:
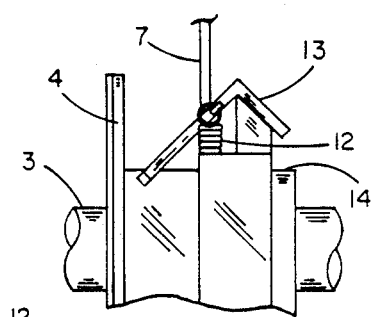
FIG. 1b is a side view similar to that of FIG. 1a with the weighted levers in resting position.
Figure 2:
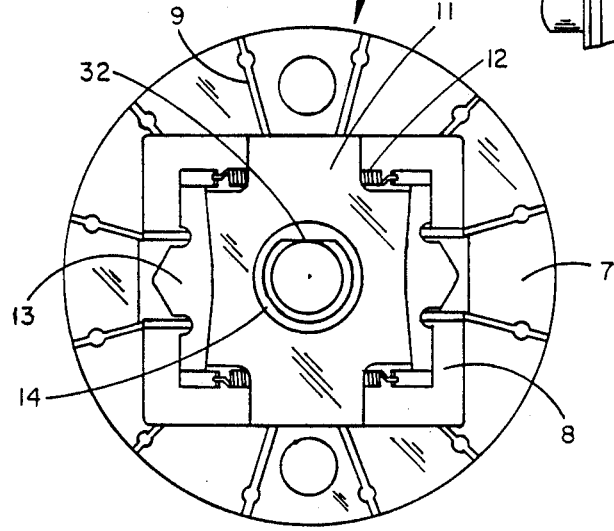
FIG. 2 is an end view of the rotor shaft bladed blower and centrifugal actuator taken in a plane through line 2—2 of FIG. 1.
Figure 3:
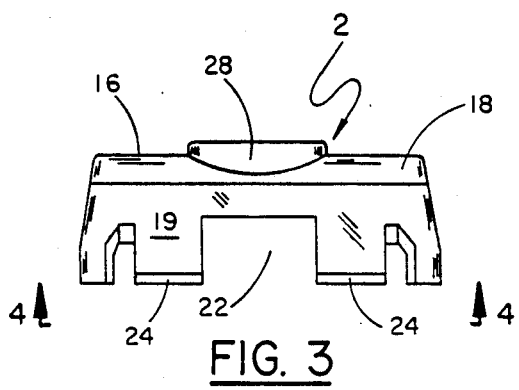
FIG. 3 is a side view of the inventive cover assembly of FIG. 1.
Figure 4:
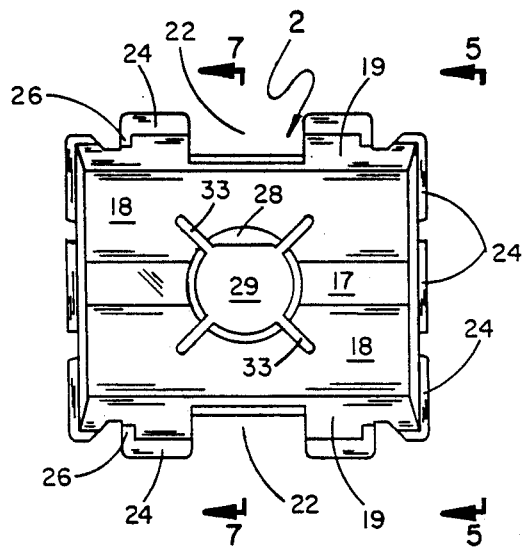
FIG. 4 is a bottom view of the open-end of the cover assembly taken in a plane through line 4—4 of FIG. 3.
Figure 5:
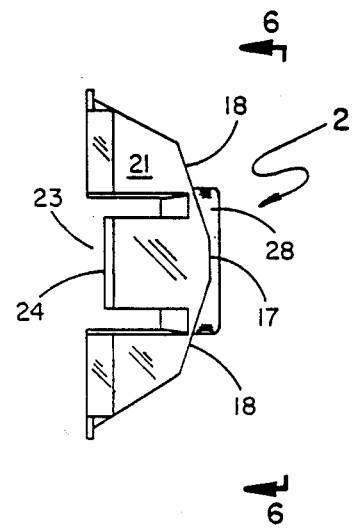
FIG. 5 is a side view of the cover assembly taken in a plane through line 5—5 of FIG. 4.
Figure 6:
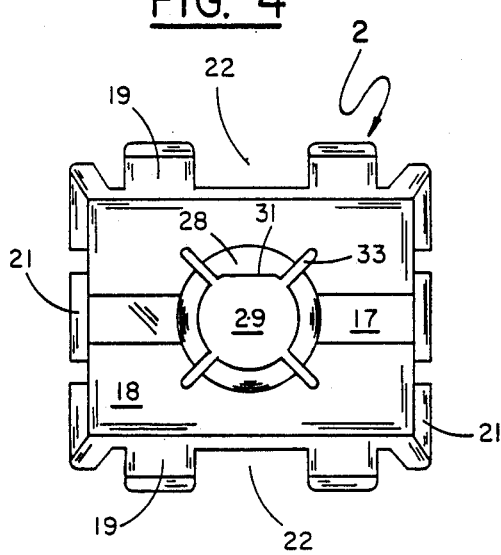
FIG. 6 is a top view of the apertured closed end of the cover assembly taken in a plane through line 6—6 of FIG. 5; and, FIG. 7 is a cross-sectional view of the cover assembly taken in a plane through line 7—7 of FIG. 4.
Figure 7:
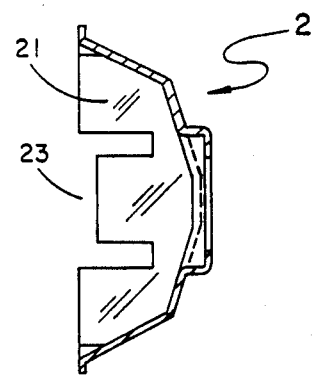

Referring to FIGS. 1 and 2 of the drawings, the novel cover assembly 2, which advantageously can be molded from a suitable thin flexible plastic material, is disclosed in exploded form prior to snug, snap-fit positioning on the electric motor rotor shaft 3. As is known in the electric motor art, rotor shaft 3 of an electric motor (not shown) has mounted thereon a centrifugal actuator 4 with a bladed blower 6 immediately adjacent thereto. The bladed blower 6, the entirety of which also can be molded from a suitable plastic material, includes a circular or disc-like back plate 7 having a centrally disposed generally square-shaped opening or recess 8. A plurality of spaced blade members 9 project substantially normally from plate 7 to extend on plate 7 in radial fashion between centrally disposed opening or recess 8 in plate 7 and the outer periphery of the plate. As can be seen more fully in FIGS. 1a and 1b, extending across opening 8 in plate 7 is a stepped bridge member 11 in the form of a stepped cross which is raised or protrudes in steps from the adjacent face of back plate 7 to provide recesses on one face of the cross adjacent opening 8 in which nest a pair of spaced helical extension springs 12. The opposite ends of each helical extension spring 12, in turn, engage with corresponding hooks provided at the extremities of weighted lever members 13 which are positioned on the other face of the stepped bridge to be held in springloaded nesting relation therewith. A latching collar 14 extends normally from bridge member 11 to snugly engage rotor shaft 3.

In accordance with the present invention, it has been recognized that in environments where there are substantial amounts of fine contaminant particulates present -- such as in woodworking shops where an electric motor of the type disclosed might be utilized with a woodworking tool like a rotary saw -- the particulates tend to build excessively and undesirably on the lever members of the centrigual actuator and the air stream flow needs to be directed without restricting flow. To prevent this situation, the present invention provides the novel cover assembly 2 for the centrally disposed recess or opening 11 and the springloaded lever members 13, as is shown in exploded fashion in FIG. 1 of the drawings. Cover assembly 2 which is open-ended is adapted to be mounted in snap-fit relation on electric motor rotor shaft 3 being sized and shaped to efficiently direct air flow to blade members 11 and to spacedly surround the recess or opening 8 in the back plate 7. The cover assembly 2 further surrounds the is spaced from weighted lever members 13 extending through opening 8 to cover such members 13 to prevent contaminant build-up thereon and, at the same time, to permit free operation of such weighted lever members.

Referring particularly to FIGS. 3-7, cover assembly 2 can be molded from a suitable somewhat flexible plastic material to be of a preselected thickness so as to be sufficiently thin to permit flexibility and yet provide sufficient rigidity and stability to retain the air foil shape disclosed. The cover assembly 2 includes an air flow shaped end wall 16 including a longitudinally extending rectangular central strip section 17 and adjacent, parallel outer longitudinally extending rectangular strip sections 18. Outer rectangular sections 18 depend, at a selected incline or slope from the outer longitudinal sides of central section 17, to form air flow shaped end wall 16. Depending from the four sides of the rectangular periphery of overall end wall 16 at a selected incline thereto to further enhance air flow to blades 7 are opposed pairs of side wall sections 19 and 21 to form a peripheral side wall for open-ended cover assembly 2. The pairs of side wall sections 19 and 21 are provided with slots beginning at their distal ends to engage in snug interfitting relation with spaced blade members 9 projecting from the back of plate 7 of bladed blower 6, the slots being of sufficient depth in the side walls that the side wall portions between slots abut the back plate 7 closing off passageways extending therebetween which communicate with the centrally disposed opening 8 in the blower back plate 7. It is to be noted that some of the side wall portions between slots of wall pairs 19 and 21 are cut away at their distal end as at 22 and 23, respectively, to accommodate the raised and stepped bridge member which, as above described, crosses the recess or opening 8. Further it is to be noted that certain select portions of the side wall between blades can be provided with tabs 24 which extend normal to the side wall portion to seat flushly against the face of palte 7. Moreover, suitable ribs 26 are provided along the sides of these tabbed portions on the inside face of these portions to give these portions added structural strength and to further inhibit the passage of air to opening 8.

As can be seen in the drawings, the central section 17 of end wall 16 is provided with a raised molded circular castellation 28 extending therefrom. Castellation 28 has an aperture 29 therein which is sized and shaped to snugly fit over rotor shaft 3. In this regard, it is to be noted that the periphery of aperture 29 has a flat section 31 sized to key with flat section 32 extending along the end of rotor shaft 3. To facilitate a firm, snap-fit grip of cover assembly 2 with the shaft, the raised castellation is provided with a plurality of spaced slots 33 extending radially from the centrally disposed aperture to provide flexible tab members therebetween which snugly grip the peripheral surface of the rotor shaft in snap-fit relation therewith.

From the above, it can be seen that a straightforward, economical and efficient to manufacture and assemble cover assembly for a compact blower and centrifugal actuator arrangement on a rotor shaft is provided which efficiently directs air distribution and prevents accumulation of particulate matter on the centrifugal actuator.

The invention claimed is:

1. In an electric motor rotor shaft assembly on which is compactly mounted a blower and a centrifugal actuator having spring-loaded lever members, the blower having a back plate with spaced blade members projecting therefrom to extend in radial fashion on said back plate between centrally disposed recess means in said back plate and the outer periphery of said back plate with said spaced blade members forming passageways extending therebetween in communication with said recess means and with said spring-loaded lever members of said centrifugal actuator projecting freely through said centrally disposed recess means in said back plate, a cover assembly for said recess means in said back plate comprising:

an open-ended cover member adapted to be mounted on said rotor shaft and the central portion of said back plate in spaced relation from the outer periphery thereof and in cooperative covering relation with said centrally disposed recess means in said back plate of said blower, said cover member including end and side walls with said end wall snuggly gripping said rotor shaft and said end and side walls being sized and shaped along the external surface thereof to efficiently direct air flow to said blade members on said back plate and spacedly surround said centrifugal actuator extending through said recess means to cover said recess means and said lever members of said centrifugal actuator projecting therethrough to prevent particulate contaminant build-up on said centrifugal actuator.

2. The cover assembly of claim 1, said open-ended cover member including an air flow shaped end wall having side wall members extending therefrom, said side wall members being slotted to engage in interfitting relation with said spaced blade members projecting from said back plate of said blower to close off said passageways formed by said spaced blade members and extending therebetween and otherwise in communication with said recess means in said blower back plate.

3. The cover assembly of claim 1, said open-ended cover member being of a thin flexible material to be snap-fit on said rotor shaft.

4. The cover assembly of claim 1, said open-ended cover member including an end wall having inclined side wall members extending therefrom, said end wall having a centrally disposed aperture therein sized to permit snug passage of said rotor shaft therethrough.

5. The cover assembly of claim 4, said end wall having a plurality of spaced slots extending radially from the periphery of said centrally disposed aperture to provide flexible tab members therebetween which snugly grip the peripheral surface of said rotor shaft.

6. The cover assembly of claim 4, said centrally disposed aperture including a peripheral flat portion sized to key with a flat portion of said rotor shaft.

7. The cover assembly of claim 4, said end wall including a centrally disposed raised castellation in which said centrally disposed aperture is positioned.

8. In an electric motor including a rotor shaft on which is mounted a blower and centrifugal actutor having spring-loaded lever members the blower having a circular back plate in which is a centrally disposed recess with spaced blade members projecting normally from said plate to extend in radial fashion between said centrally disposed recess in said back plate and the outer periphery of said back plate with said spaced blade members forming passageways extending therebetween in communication with said centrally disposed recess and with said centrally disposed recess having a bridge member extending thereacross in raised fashion from said back plate to provide resting means for said spring-loaded lever members of said centrifugal actuator which extend through said centrally disposed recess in said back plate of said blower, a cover assembly for said recess means in said back plate comprising:

a thin flexible plastic open-ended cover member adapted to be mounted in snap-fit relation on said rotor shaft, said flexible plastic cover member being sized and shaped to efficently direct air flow to said spaced blade members projecting from said back plate of said blower and to spacedly surround said spring-loaded lever members of said centrifugal actuator which extend through said centrally disposed recess to rest on said bridge member, said open-ended cover member being sized and shaped to efficiently direct air flow to said blade members to include an air flow shaped end wall member having a longitudinally extending central strip section with parallel outer sections depending at an incline therefrom and side wall sections depending at an incline from said sections of said end wall member said side wall sections being slotted to engage in snug interfitting relation with said spaced blade members projecting from said back plate of said blower, the slots being of sufficient depth in the side walls that the side wall portions between the slots abut the blade plate closing off said passageways formed by said spaced black members extending therebetween and otherwise communicating with said centrally disposed recess in said blower back plate, said end wall having a raised circular castellation extending therefrom, said castellation having an aperture therein with the periphery thereof sized and shaped to key with said rotor shaft, said raised castellation having a plurality of spaced slots extending radially from said centrally disposed aperture to provide flexible tab members therebetween which snugly grip the peripheral surface of said rotor shaft in snap-fit relation therewith.

* * * * *

UNITED STATES PATENT AND TRADEMARK OFFICE
CERTIFICATE OF CORRECTION

PATENT NO. : 4,839,549

DATED : June 13, 1989

INVENTOR(S) : Nicholas R. Daniels

It is certified that error appears in the above-identified patent and that said Letters Patent is hereby corrected as shown below:

Column 1, line 17, after "motor", insert ---rotor---;
line 24, "blade" should be ---bladed---.

Column 2, line 16, "scope of" should be ---scope or---.

Column 3, line 35, "surrounds the" should be ---surrounds and---.

Column 4, line 6, "palte" should be ---plate---.

Column 5, line 25, "actutor" should be ---actuator--.

Column 6, line 25, "black" should be ---blade---.

Signed and Sealed this

Twenty-fourth Day of April, 1990

*Attest:*

HARRY F. MANBECK, JR.

*Attesting Officer*  *Commissioner of Patents and Trademarks*